June 19, 1934.                R. R. LEWIS ET AL                1,963,856
                                PRINTER'S ROLLER
                              Filed Aug. 29, 1931
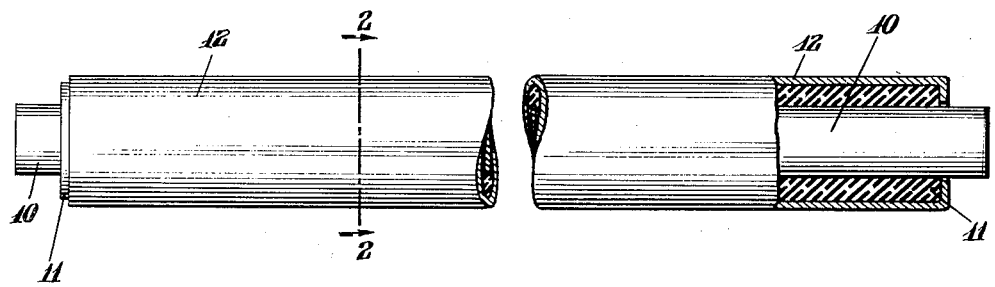
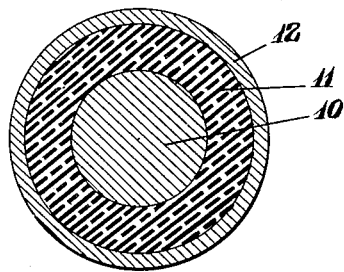

Patented June 19, 1934

1,963,856

UNITED STATES PATENT OFFICE 1,963,856

PRINTER'S ROLLER

Robert R. Lewis, Freeport, and Albert J. Weiss, Brooklyn, N. Y., assignors to Vulcan Proofing Company, New York, N. Y., a corporation of New York Application August 29, 1931, Serial No. 560,240

7 Claims. (Cl. 91—67.8)

Our invention relates to a new and improved printer's roller.

One of the objects of our invention is to provide a rubber roll for use in printing, in which the rubber material of the roll is covered with a thin layer of protective composition, which is resistant to oils, greases, and the like.

Another object of our invention is to provide a soft printer's roll, made of soft rubber, and having a very high resistance to oil or the like.

Other objects of our invention will be set forth in the following description and drawing, it being understood that the above general statement of the objects of our invention is intended to generally explain the same, without limiting it in any manner.

Fig. 1 is an elevation, partially in section.

Fig. 2 is a sectional view on the line 2—2 of Fig. 1.

Printers' rollers have been known for many years and these rollers have consisted of a rigid core, made of iron or the like, and this core was covered with a soft and resilient composition which could take up the oil. It has been proposed to use rubber as a covering for the iron core, so that the rubber constituted the body of the roller. However, the use of rubber has been objectionable because rubber is readily attacked by oils, greases, and the like.

According to our invention, an improved protective composition is applied to the surface of a printing roller having an iron core 10 and a body 11 which is made of pure rubber, or of various rubber compositions, it being understood that the rubber body is soft and resilient. The iron core may be of different thicknesses, namely ½-9 inches, and the total thickness of the annular body of the roller may be about one inch. About seven-eighths of an inch of the annular body of the roller may be made of pure rubber and an outer protective coating is applied having a thickness of about one-eighth of an inch.

The rubber is first applied to the iron core or roll in the usual manner and the rubber is then vulcanized and buffed until the diameter of the roll is one-eighth of an inch less than the final diameter which is desired.

The outer surface of the rubber is then coated in any suitable manner with the improved protective composition, which forms a coating 12.

The improved protective composition is of the type which results from interacting polysulphides and additive halogen olefins. A large number of these plastic compositions can be made by selecting various polysulphides and various additive halogen olefins. Likewise, the protective composition can be greatly varied by adding additional ingredients and by suitably compounding and processing said plastic compositions. This plastic composition produces an ink-resistant surface upon the printing roller. The preferred composition which is used for protecting the outer surface of the rubber is as follows:

| | |
|---|---|
| Ethylene polysulphide | 100 |
| Rubber | 40 |
| Para-coumarone resin | 20 |
| Carbon black | 15 |
| Zinc oxide | 15 |
| (Plasticizer) — sulphonated Burgundy pitch | .5 |
| Paraffin | .5 |
| Stearic acid | .5 |
| Mercaptobenzothiazole | .375 |
| Sulphur | 1.625 |
| Diphenyl guanidine | .5 |
| | 194.0 |

For coating the outer rubber surface of the rubber, we prefer to use such a composition containing an ethylene polysulphide. After this protective composition has been applied to the outer surface of the rubber, the roll is again vulcanized at a temperature of 287° F. This vulcanization causes the outer protective layer to unite with or to adhere to the rubber, so as to produce a very firm union. After the vulcanization, the roll can be again buffed to produce the exact finished diameter.

The outer protective layer has the same soft and yielding properties as the vulcanized rubber base of the body, so that a printing roller having a body of uniform properties is produced.

The basic ingredient of the protective composition may be produced by the reaction between sodium polysulphide and dichlor ethylene, it being understood that other polysulphides may be used and that other additive halogen compounds of olefin may be used. Likewise, we do not wish to be limited to the specific formula disclosed, because factis and like ingredients may be added.

The method of coating the vulcanized rubber base with the protective composition can be as follows:—

The protective composition or compound is mixed on a two-roll mill of the ordinary type in the usual manner so that all the ingredients are thoroughly intermixed. The protective composition is then calendered on a liner and this liner is applied spirally around the rubber base of the roll by hand. A coating of ordinary rubber cement can be applied to the rubber base before the protective composition is applied thereto, in order to secure a satisfactory bond between the rubber base and the first layer of the protective composition. The desired thickness of the protective composition can be built up by applying successive layers thereof, by use of the liner, each layer of protective composition having a thickness of about 0.30 in. When successive layers of the protective composition are applied, the contacting surfaces of the successive layers can be washed by a suitable solvent, such as benzol, in order to secure a proper union. It is to be understood that after the first layer of protective composition has been applied, the roll is vulcanized by heating it to a temperature of 287° F. as previously mentioned, so that successive thicknesses of the protective composition are applied, until the protective composition has the required total thickness, namely about ¼ to 1½ inches, radial thickness.

Each layer of the rubber composition which is underneath the final layer is vulcanized by a heat treatment at about 270° F., for a period of about one and one-half hours. The surface of the protective composition is dry and non-tacky before the heat treatment or vulcanization, and this heat treatment does not harden the protective composition, at least to an extent sufficient to make it brittle, and the surface remains dry and non-tacky after vulcanization or heat treatment.

Instead of using sodium polysulphide in order to form the base of the protective layer, we may use other soluble polysulphides, such as the polysulphide of potassium, calcium, ammonium, or of any of the alkaline or the alkali earth metals. Likewise, the dichlor ethylene may be replaced by dichlorides of propylene or of the higher members of the olefin series.

Likewise, the dibromides of the olefin may be used instead of the dichlorides.

While the protective composition has a certain amount of rubber therein, it consists essentially of non-resinous material, because the basic ingredient which imparts the characteristic properties to the composition is the ethylene polysulphide or its equivalent.

In order to prepare the coating of the protective compound, the ethylene polysulphide or its equivalent can be masticated on the mill until it becomes somewhat plastic. The rubber is separately masticated and the reaction plastic and the rubber are then milled together. The other ingredients are then added and thoroughly intermixed on the mill. The functions of the various ingredients of the batch, other than the ethylene polysulphide or other reaction plastic are as follows:—

The rubber is not absolutely necessary but it is added to improve the calendering of the reaction plastic. The mercaptobenzo thiazole and the sulphur are added to vulcanize the small amount of rubber during the final heat treatment. The diphenyl guanidine serves as a plasticizer, and the other plasticizer is added in order to additionally plasticize the ethylene polysulphide or other reaction plastic. The stearic acid and paraffin also add to the calendering qualities of the compound. The carbon black increases the strength and toughness of the compound. The zinc oxide is an important ingredient, because it changes the properties of the reaction plastic during the final heat treatment, in a manner which seems to be similar to the action of sulphur in vulcanizing rubber.

The coating for the roller is resilient and resistant to the action of printer's ink. The coating material specified herein may be generally designated as being a polymerized material resulting from the reaction of sulphur and a halogenized unsaturated hydrocarbon. Said coating material is substantially non-porous.

The type of material represented by ethylene polysulphide may be referred to as a reaction plastic, it being understood that the claims for the article of manufacture are not to be limited to any particular process of manufacture.

Whenever the term "reaction plastic" is used in the claims, it is to be understood that we do not include a condensation resin, and that we define a "reaction plastic" as a plastic material resulting from a chemical reaction without condensation.

While the reaction plastic is ordinarily quite resistant to the action of oils, inks, etc. the heat treatment imparts thereto desirable physical properties for the purposes specified, in addition to which the reaction plastic is rendered insoluble so that it is not attacked by oils, inks or any of the solvents.

We have shown a preferred embodiment of our invention, but it is clear that numerous changes and omissions can be made without departing from its spirit.

We claim:

1. A printer's ink-applying roller comprising a yieldable base and a bendable and ink-resistant coating, said base being free from fabric material, said coating being a polymerized material resulting from the reaction of sulphur and an additive halogen olefin.

2. A printer's ink-applying roller comprising a yieldable base which consists substantially of rubber, said base having a coating of resilient and ink-resistant material said material being a polymerized material resulting from the reaction of sulphur and an additive halogen olefin.

3. A printer's ink-applying roller comprising a yieldable base having a bendable and ink-resistant coating said coating including at least substantially 50% of a polymerized material resulting from the reaction of sulphur and an additive halogen olefin, and vulcanized rubber, said base consisting substantially of rubber.

4. A printer's ink-applying roller comprising a yieldable base having a resilient and ink-resistant coating of material, said material being a reaction product under heat, of zinc oxide and of a polymerized material resulting from the reaction of sulphur and an additive halogen olefin, said base consisting substantially of rubber.

5. A method of making a printer's ink-applying roller which consists in forming a yieldable base substantially from vulcanized rubber, and then coating said base with a plastic material, and heating said plastic material, said material being a polymerized material resulting from the reaction of sulphur and an additive halogen olefin.

6. A method of making a printer's ink-applying roller which consists in forming a yieldable base from connected layers of yieldable rubber while successively vulcanizing said layers, before applying the next layer, and then applying to the yieldable base a coating of plastic and resilient and ink-resistant material, and heating said material.

7. A method of making a printer's ink-applying roller which consists in forming a yieldable base from connected layers of yieldable rubber while successively vulcanizing said layers, before applying the next layer, and then applying to the yieldable base a coating of plastic and resilient and ink-resistant material, and heating said material, said material being a polymerized material resulting from the reaction of sulphur and an additive halogen olefin.

ROBERT R. LEWIS.
ALBERT J. WEISS.